April 6, 1965 H. S. SHAW 3,176,737
TUNG NUT HULLER

Filed Aug. 30, 1962 2 Sheets-Sheet 2

INVENTOR.
HAROLD S. SHAW

ATTORNEYS

United States Patent Office 3,176,737
Patented Apr. 6, 1965

3,176,737
TUNG NUT HULLER
Harold S. Shaw, P.O. Box 264, Picayune, Miss.
Filed Aug. 30, 1962, Ser. No. 220,390
13 Claims. (Cl. 146—8)

This invention relates to tung nut hulling, and more particularly to a portable tung nut hulling apparatus capable of progressive movement through the field and simultaneous hulling of tung nuts.

Tung oil, extracted from tung nuts, comprises a valuable paint additive having excellent insect repellant qualities. The process of hulling tung nuts to obtain the meat or kernels to be pressed for the oil, conventionally requires an extended series of successive stages. When the nuts are first picked up from the ground where they have fallen, the moisture content is usually high, for example, in the range of about thirty to fifty percent by weight. If these wet tung nuts are then hulled without drying, using conventional heavy crushers located in nearby processing plants, the production rate is very low. Also the moist hulls are ground too finely and become mixed with the meats, thereby making separation of the meats and fine shells extremely difficult without loss of the kernel. The crushed, fine shells and dirt, i.e. "fines," are conventionally dumped into separation screens adapted to pass the meats, and having an overhead suction tube to remove the shells. Since the fines from moist nuts are so excessive, the suction must be very great to remove substantially all of them. However, it has been found that if the suction is increased sufficiently to remove all fines and hulls, it sucks the valuable meats off also. If it is decreased sufficiently to prevent loss of the meats, the fines pass through the screen with the meats. Either way the separation problem is great. Therefore, tung nuts are normally dumped from the pickers' hampers into porous sacks or bags such as burlap bags. These bags are manually hoisted and suspended in the tung trees for a drying period, usually several days. They must be dried to a moisture content of about twenty to twenty-five percent to suit conventional crushing equipment. Then the bags are manually removed from the trees, and transported to special processing plants for hulling.

If, however, drying occurs rapidly and the moisture content is inadvertently allowed to fall below about twenty percent, a considerable loss of the nut meats occurs during hulling because the dry meats are readily chipped into small particles, thereby again making separation from the hulls extremely difficult.

It is obvious, therefore, that the harvesting of hung nuts requires a series of steps extending over a period of time, requiring a considerable supply of porous bags, necessitating considerable manual labor to bag the nuts and hang the bags in the trees, remove the bagged nuts from the trees, and haul the tung nuts to processing plants. Even after all of these steps, if the bags are removed from the tree too soon or too late, substantial losses are experienced.

Not only is present hulling equipment limited to a critical moisture content of the nuts, but such equipment is also extremely heavy and cumbersome, and completely incapable of being transported through nut groves or fields for hulling in the field.

It is therefore an object of this invention to provide a portable tung nut hulling apparatus which is lightweight and readily towed to and through a nut grove or field for progressive hulling as it passes through the field. It enables satisfactory tung nut hulling in the field for the first time as far as is known. The novel huller is moreover capable of hulling nuts having a moisture content which can vary widely. In fact, it operates well on nuts having moisture contents of thirty percent, forty percent, forty-five percent and even about fifty percent. The huller can therefore receive nuts directly from the picker's hamper, without any drying period. It thus eliminates the need for porous bags, the extended bag suspension period, hauling whole fruit to the processing plant, and all the manual labor required for these tasks. Moreover, extended use of the novel apparatus has shown that the nut meats do not become badly chipped or ground. This enables simple, rapid separation of the nut meats from the hulls, with virtually no loss of the meats, and no separation problem, regardless of the moisture content. Further, since hulling occurs in the fields, the fertilizer value of the hulls, which comprise about fifty-five percent by weight of the nut, remains right in the field to naturally enrich the soil in potash, a little nitrogen, phosphate, and other elements, in addition to the organic matter contained. This allows less fertilizer to be annually applied to the fields.

It is therefore another object of this invention to provide a nut hulling apparatus that provides savings in time, in cost of bags, in hauling expense, in cost of separation equipment, in fertilizer costs, and in labor costs. The quantity of valuable nut meats is increased. It enables convenient hulling at any time and on the spot, without a crucial drying period.

These and several other objects of this invention will be apparent upon studying the following specification in conjunction with the drawings in which:

FIG. 4 is a perspective view of a typical tung nut;

FIG. 5 is a sectional view of the tung nut in FIG. 4;

FIG. 6 is a fragmentary enlarged perspective view of the metering apparatus for the hopper in FIG. 1; and FIG. 7 is a fragmentary enlarged perspective view of part of the adjustable baffle mounting means.

Basically, the inventive tung nut huller comprises an inclined support surface or platform adapted to receive nuts at the lower end, preferably through a hopper, a series of nut beater or striker means arranged to protrude through slots in the surface and comuprising spaced spindles having radially extending striking fingers revolving on the spindles at high speeds toward the upper end and protruding through these slots to both break off the hulls and constantly remove fines from the inclined surface, nut retaining cover means over the surface and beater means, controlled depth baffle elements suspended above the surface and vertically adjustable from the inclined surface enabling regulation of nut progression from bottom to top, and separation means at the top of the surface to separate the unhulled nuts from the hulls and from the nut means. A metering inlet means is provided in the inlet hopper. The separation means preferably comprises suction means to remove the larger hulls, and a vibrating screen to pass the nut meats and separate them from unhulled nuts. Recycle conveyor means back to the inlet hopper is provided for the unhulled nuts to return them for a second run through the hulling apparatus.

Figure 1:
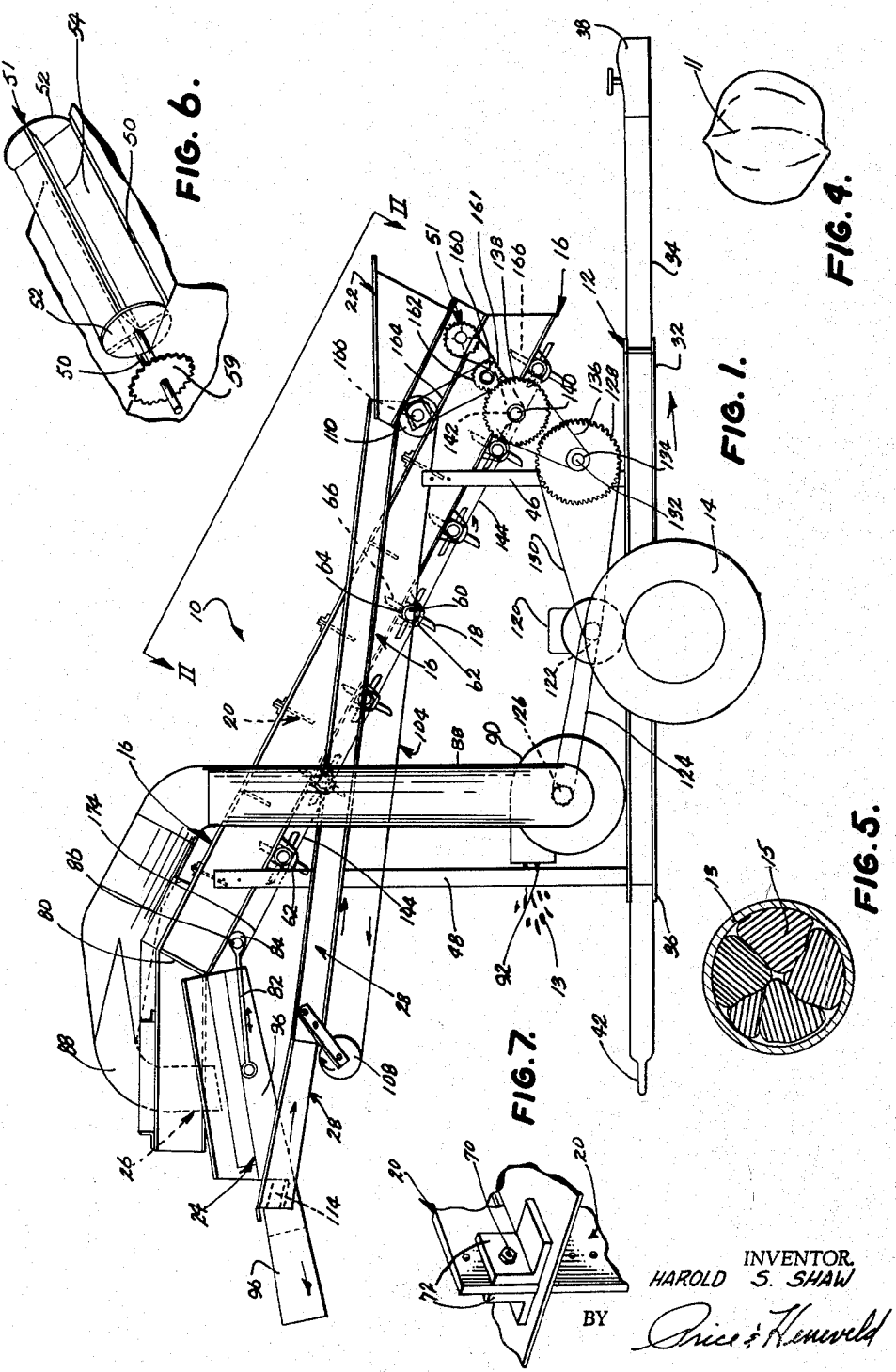
FIG. 1 is a side elevational view of the portable nut hulling apparatus.

Referring now to the drawings, the complete tung hulling apparatus 10 is illustrated in FIG. 1, including a support frame 12 which essentially comprises a trailer frame having wheels 14. The frame supports an inclined conduit 16 having a lower support surface 59, a series of rotating beater means 18, adjustable, progression-control baffles 20, inlet hopper means 22, inlet metering means 51, separation screen means 24, hull-removal suction means 26, and recycle conveyor means 28.

The frame 12 may assume several forms, and is here shown to comprise a generally rectangular, skeletal frame formed of interconnected channel elements 32 on the sides, 34 on the front, and 36 on the rear. A tow tongue 38 extends to the front of the apparatus for towing by a tractor. A trailer or wagon towing tongue 42 extends to the rear for towing a field wagon (not shown) where the hulled nuts are hauled in containers. Extending upwardly from this support frame are a first pair of front upright members 46, and a second pair of longer, rear upright members 48. Mounted on an angle of about thirty degrees in an inclined fashion to these upright supports 46 and 48 as by bolts or by welding is conduit 16. This is preferably formed of sheet metal having a rectangular cross section.

This conduit means 16 has a hopper 22 affixed to the top thereof at the front, lower end to receive unhulled tung nuts. Passage of tung nuts through opening 50 between hopper 22 and the lower end of the conduit is regulated by a metering means 51 which comprises a generally cylindrical device having hubs 52 on either end and radially projecting wing panels 54. This revolves at a controlled rate to meter tung nuts into conduit 16 from the hopper.

Figure 2:
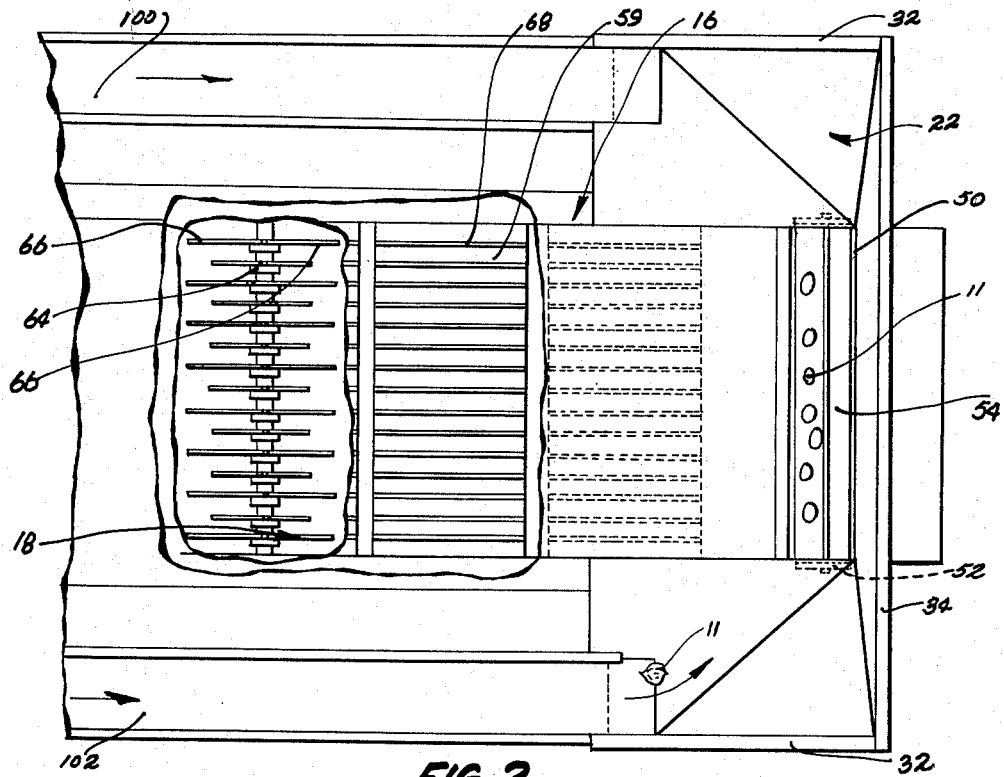
FIG. 2 is a fragmentary plan view of the apparatus in FIG. 1 and taken on plane II—II.

The floor or platform 59 of conduit means 16 comprises a support surface for the tung nuts in their progression from the lower front end of the conduit means to the upper rear end. Mounted beneath this floor is a series of spaced beater means 18. Each of these beater means includes a spindle or shaft 60 supported between opposite trunnion bearings 62. Spaced along the spindle is a plurality of beater hubs 64 here shown to be fifteen in number (FIG. 2). Each of these hubs has a plurality of preferably four radially-extending steel striker fingers 66. The end portions of the fingers pass through the parallel elongated slots 68 in the floor 59 of the conduit means. These beater means revolve at speeds of several hundred r.p.m. to crack the hulls from the nuts and throw them up the incline. In order to progressively crack the hulls from all of the nuts by the time they traverse the length of the chute, regardless of their moisture content or shell hardness, a series of progression-control baffles 20 are mounted transversely in the top of the chute. These are suspended from the top to a controlled depth so that the distance from the bottom is accurately set. Each of these baffles may include a series of openings at the top so that retaining pins 70 which secure them between flanges 72 of the top of the chute, can be withdrawn and replaced in different openings to obtain vertical adjustment of each baffle. A baffle is not provided between the lowermost beater spindle and the second beater spindle so that tung nuts will not tend to pile up in the lower end of the chute when dumped from the hopper, but will be rapidly moved into the progressive stages up the chute. The several beater means all revolve in the same direction to cause the ends of the steel strikers to move through the slots in the platform toward the upper end of the chute. By presetting the baffle means to suit the characteristics of the tung nuts, substantially all of the tung nuts will be hulled when they finally reach the top of the chute. Another important aspect of the slots in the bottom or support surface and the fingers is their constant cleaning action causing removal of dirt and tung hull pieces, i.e. fines. If the hulls are wet, they tend to break up into small particles which fall through the slots 68 adjacent each beater. By the time the nut meats, large hulls, and a few unhulled nuts reach the top, the fines are removed. Therefore, the fines present no problem in the next stage of screen-suction separation. It has been found with extended use that the meat or kernels do not become broken, but rather are pushed up the chute, step by step, by the fingers, to finally emerge at the top of the chute. The loss of kernels in the chute is substantially nil.

Figure 3:
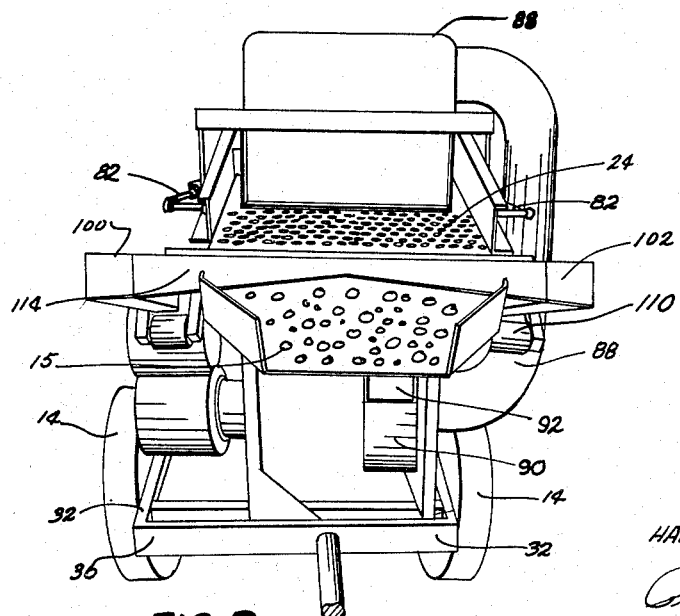
FIG. 3 is an end, rear elevational view of the apparatus in FIG. 4.

As the hulled nut meats, along with a few unhulled nuts, and the large hulls which did not fall through the slots, emerge at upper end 80 of chute 16, they fall upon a reciprocating or vibrating separating screen 24 shown more specifically in FIG. 3. This screen is reciprocated by drive rod 82 mounted in a conventional eccentric manner at its front end 84 to drive hub 86. The openings in the screen are large enough to pass the kernels, but small enough to retain unhulled nuts. Immediately overhead of the screen is the terminal end of a suction means which essentially comprises a tubular element 88 that extends to suction blower 90 having an outlet 92. The large hulls on the screen are readily sucked up into this tube, transported through the blower, and discharged out outlet 92 onto the ground where they serve as fertilizer. The nut meats fall through the openings in screen 24 onto chute 96 and pass off the rear thereof into a field wagon (not shown) for hauling. Since the fines are already removed, they do not fall through the screen to mix with the meats, nor do they require excessive suction any longer. The unhulled nuts wall onto transverse platform 114, and roll sideways unto either conveyor 100 or 102 which are on opposite sides of conduit 16. Each of these conveyors may include a suitable belt 104 on pulleys 108 and 110 for transporting the unhulled nuts back to hopper 22, where they are recycled.

The power for all of the moving devices is obtained from a power source such as an internal combustion engine 120 of about eight to twelve horse power. This may be mounted in any suitable location on frame 12, and for convenience is shown to be mounted in the center. Motor 120 drives blower 90 through sprocket 122, chain 124, and sprocket 126 on the blower. Likewise, it drives large sprocket 128 through chain 130. Sprocket 128 drives shaft 132, which in turn drives sprocket 134 for chain 136 to sprocket 138. Sprocket 138 rotates shaft 140 which in turn drives sprocket 142. Sprocket 142 in turn drives a series of chains 144 to all of the respective sprockets on the respective spindles of the beater means along the conduit. Shaft 140 also drives chain 161 through a sprocket (not shown) behind sprocket 142, to rotate the sprocket 59 for metering means 51, and to also drive sprocket 160, sprocket 162, chain 164, and sprocket 166 which drives conveyor belt hubs 110 for the recycle conveyor means. The uppermost spindle drives an additional chain 174 which operates hub 86 for eccentric shaft 82 to the vibrating separator screen 24.

Thus, all of the moving components are operated simultaneously from the relatively small internal combustion engine 120 to provide a compact, lightweight structure capable of being readily hauled behind a tractor to the nut groves and fields for harvesting. Further, it can be pulled along the road by a vehicle at high speeds for use at another grove miles away.

*Operation*

Since the operation of the apparatus is largely obvious from the foregoing description of the apparatus, it will be described only briefly. Basically, tongue 38 is connected to a tractor (not shown) for towing it through the nut grove, and a trailer or wagon is connected at 42 behind the huller to hold the hulled nut meats. While the human pickers pick up the tung nuts 11 from the ground and place them in their hampers, the tractor tows the huller and wagon so the pickers can dump the tung nuts directly from the hampers into hopper 22. The engine 120 operates continuously to drive the several beater means, the blower, the metering means 52, the vibrating screen 24, and the recycle conveyors 28. As the nuts are dropped in hopper 22, they are metered by wings 54 of metering device 51 into the conduit 16 adjacent the first series of beater elements. The striker fingers 66 rotating in a counterclockwise direction as viewed in FIG. 1, strike the nuts and throw them up the inclined chute 16. Some hulls are cracked off. The unhulled nuts strike baffles 20 in their progression and are repeatedly struck until the hulls are cracked during their progression up the chute. The depth of the baffles 20 determines the rate of progress up the chute to suit particular nut characteristics. The hulled nut meats are pushed up along the floor or platform of the chute during revolution of the fingers to finally emerge at the top. The fines fall through slots 68 by the cleaning action of the fingers. Some larger hulls are forced through the slots. The larger hulls 13 which are not forced through the slots emerge at the top and pass unto screen 24 where they are sucked up through conduit 88 and blown out the rear 92 of blower 90. The nut meats 15 fall through screen 24 and onto chute 96 to a container (not shown). The unhulled nuts 11 fall onto narrow platform 114, roll to the sides, and down chute 28 onto belts 104 to return to hopper 22 for recycling.

Various advantages in addition to those specifically recited above will readily occur to those in the art upon studying the illustrated form of the invention. Also, various obvious modifications to the structure depicted, but within the principles of the invention as taught, will occur to those in the art. These obvious modifications are deemed to be part of this invention, which is to be limited only by the scope of the appended claims and the reasonably equivalent structures to those defined therein.

I claim:

1. A tung nut huller adapted to hull tung nuts of variable moisture content comprising: an inclined support surface adapted to receive nuts at the lower end; a plurality of elongated slots in said support oriented along the inclination thereof; a series of nut-beater means along said surface moving at controlled high speeds and mounted to cause said nut-beater means to momentarily pass through said slots and above said support surface to strike and throw unhulled nuts, push hulled nut meats along said surface, and clean the surface of fines; said nut-beater means being mounted and driven to move toward the upper end of said inclined surface when extending through said slots above said surface; nut retaining cover means over said surface and beater means; controlled depth baffle elements above said surface and spaced between the bottom and top of said inclined surface, enabling regulation of nut progression from bottom to top; and separation means at the top of said surface, thereby enabling continuous progressive hulling and separation of tung nut meats.

2. A nut huller apparatus comprising: platform means having elongated slots therein; nut inlet means to one end thereof and outlet means at the opposite end; a plurality of spaced rotatable spindles mounted adjacent said platform means; each of said spindles having a plurality of radially extending beater and pusher elements momentarily extending partially above said platform means through said slots when rotated; powered drive means operably associated with said spindles; and said drive means and spindles being mounted and cooperative to move said beater and pusher elements toward said opposite end when extending above said platform means so that said drive means can rotate said spindles and elements to progressively beat the hulls from nuts placed on the bottom of said platform means, remove dirt and small hull pieces through said slots, and push the hulled nut meats along said platform means.

3. A nut huller apparatus comprising: inclined platform means including an upper discharge end; a plurality of spaced spindles mounted adjacent and beneath said platform means; each of said spindles having a plurality of radially extending beater and pusher elements momentarily extending partially above said platform means when rotated; powered drive means operably associated with said spindles to rotate said spindles and thereby rotate said elements toward said upper discharge end and progressively beat the hulls from nuts placed on the bottom of said platform means, remove dirt and small hull pieces, and push the hulled nut meats toward the top of said platform means; and intermittent interference means between said spindles above said platform to regulate flow of nuts toward said upper discharge end.

4. A nut huller apparatus comprising: a conduit; a plurality of spaced baffles depending in said conduit; the floor of said conduit having longitudinal slots therein; a plurality of progressive beater and pusher elements adapted to swing rapidly through said slots and momentarily into said conduit; said pusher and beater elements being spaced between said baffles over the length of said conduit; a nut inlet opening in one end of said conduit; and a nut meat and husk outlet at the opposite end of said conduit toward which said elements swing, so that the husks of nuts can be progressively beat from the meats which are then pushed to said outlet.

5. A tung nut huller comprising: an inclined conduit; a plurality of spaced baffles depending into said conduit part way to the floor thereof; a plurality of rotating, transverse spindles mounted beneath said floor and spaced longitudinally between said baffles; each of said spindles having a plurality of radial beater, pusher elements; said floor having longitudinal slots through which said elements pass momentarily into said conduit when rotated and out which dirt and hull pieces pass; nut inlet hopper means at the base of said chute; and nut, meat, and hull separating means at the top of said chute.

6. The huller in claim 5 wherein said separating means includes suction means for removing larger hulls.

7. The huller in claim 6 wherein said separating means includes a vibrating screen to separate nut meats from unhulled nuts, and allow suction removal of hulls.

8. The huller in claim 5 including recycle conveying means to return the unhulled nuts to the inlet hopper means.

9. The huller in claim 5 wherein said inlet hopper means includes nut inlet metering means.

10. The huller in claim 5 wherein said baffles are pertically adjustable to control the rate of progression of the nuts through the huller.

11. A portable huller adapted to hull tung nuts of variable moisture content comprising: a wheeled frame having mounted thereon an inclined support surface adapted to receive nuts at the lower end; said support surface including a plurality of elongated slots extending along the inclination of said surface; a series of nut-beater means along said surface moving at high, controlled speeds momentarily through said slots to strike and throw unhulled nuts, and push hulled nut meats along said surface; power means operably connected with said nut-beater means to move said nut-beater means toward the upper portions of said inclined surface when passing through said slots; nut retaining cover means over said surface and beater means; controlled depth baffle elements above said surface and spaced between the bottom and top of said inclined surface, enabling regulation of nut progression from bottom to top; and separation means at the top of said surface, thereby enabling continuous progressive hulling and separation of tung nut meats.

12. A portable tung nut huller capable of hulling tung nuts in the nut groove, comprising: a wheeled frame; an engine on said frame; an inclined conduit; a plurality of spaced baffles depending into said conduit part way to the floor thereof; a plurality of rotating spindles mounted beneath said floor and spaced longitudinally between said baffles; each of said spindles having a plurality of radial beater, pusher elements; said floor having longitudinal slots through which said elements pass momentarily into said conduit when rotated and out which unwanted fines can pass; nut inlet hopper means at the base of said chute; means for separating said hulls, meats, and nuts; and said spindles and separating means being operably associated with said engine.

13. A portable tung nut huller capable of hulling tung nuts in the nut grove, comprising: a wheeled frame; an engine on said frame; an inclined conduit; a plurality of spaced baffles depending into said conduit part way to the floor thereof; a plurality of rotating transverse spindles mounted beneath said floor and spaced longitudinally between said baffles; each of said spindles having a plurality of radial beater, pusher elements; said floor having longitudinal slots through which said elements pass momentarily into said conduit when rotated and out which fines may pass; nut inlet hopper means at the base of said chute; suction means for removing said hulls; a vibrating screen to separate the nut meats from unhulled nuts; recycle conveying means to return unhulled nuts to the inlet hopper means; nut inlet metering means in said inlet hopper means; and said spindles, suction means, vibrating screen, and metering means being operably associated with said engine.

References Cited by the Examiner

UNITED STATES PATENTS

| | | |
|---|---|---|
| 541,431 | 6/95 | Easton. |
| 828,736 | 8/06 | Gwaltney. |
| 1,187,774 | 6/16 | Olier _____ 146—9 |
| 1,297,497 | 3/19 | Rosenthal _____ 146—8 |
| 2,279,987 | 4/42 | Guerra _____ 146—8 |
| 2,381,288 | 8/45 | Jones _____ 146—9 |

J. SPENCER OVERHOLSER, *Primary Examiner.*